Oct. 28, 1924.  1,513,202
E. E. WEMP
CLUTCH
Filed Sept. 13, 1920
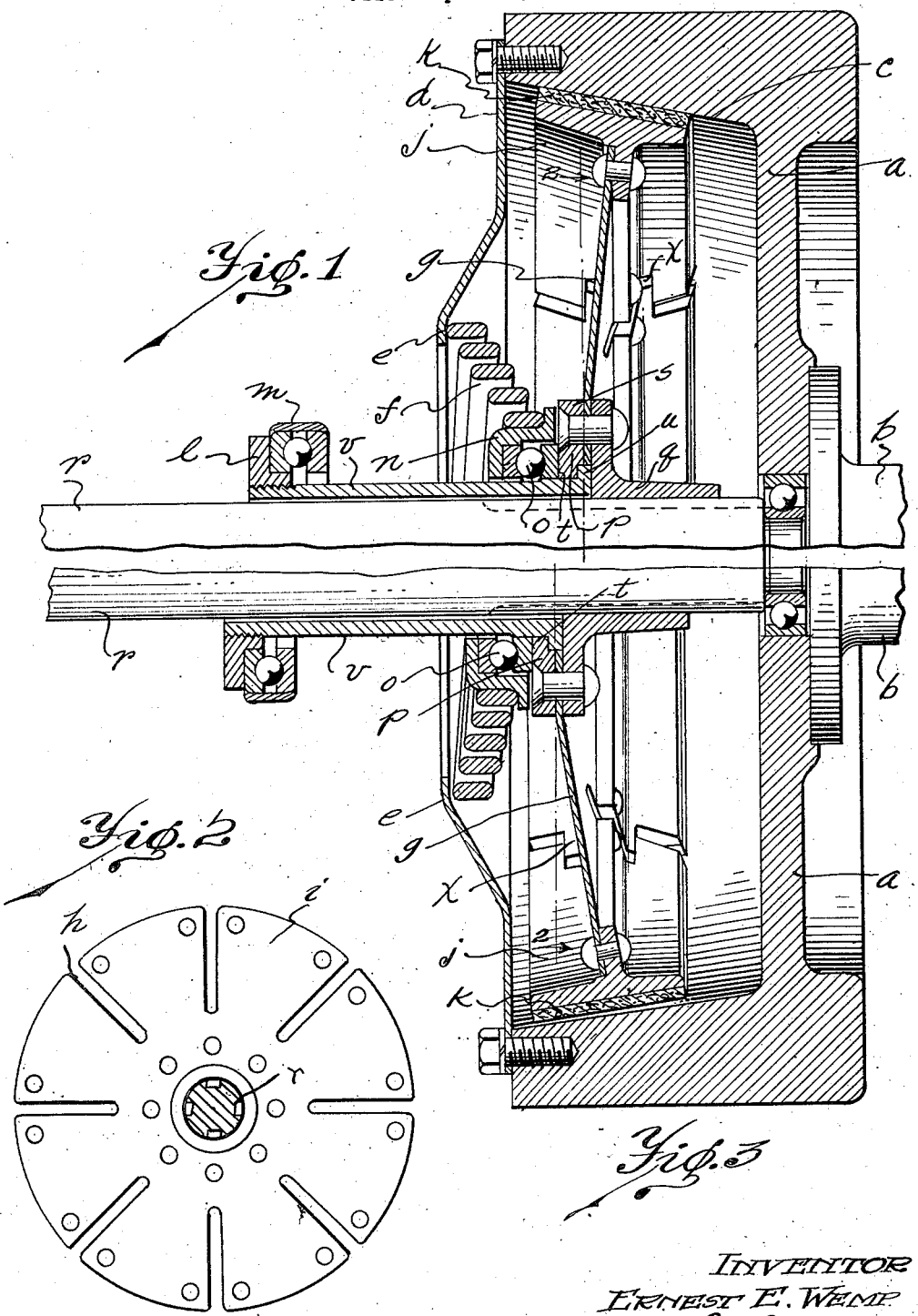
INVENTOR
ERNEST E. WEMP
BY
Stuart C. Barnes
ATTORNEY.

Patented Oct. 28, 1924.

1,513,202

UNITED STATES PATENT OFFICE.

ERNEST E. WEMP, OF EVANSVILLE, INDIANA.

CLUTCH.

Application filed September 13, 1920. Serial No. 409,832.

*To all whom it may concern:*

Be it known that I, ERNEST E. WEMP, a citizen of the United States, residing at Evansville, in the county of Vanderburgh and State of Indiana, have invented certain new and useful Improvements in Clutches, of which the following is a specification.

This invention relates to clutches, and has for its object a new type of clutch which is characterized by an almost entire absence of grabbing when it goes into action and which is a most economical and simple construction.

In the drawings,—

Fig. 1 is a section along the axis of the driving shaft showing the clutch parts engaged.

Fig. 2 is a plan view of the clutch disk.

Fig. 3 is a view similar to Fig. 1 showing the clutch parts disengaged.

The fly wheel $a$ is the driving member, being attached to the crankshaft $b$ and having a conical interior or clutching surface $c$. However, as will be explained, it is not essential that this surface be conical for it might be cylindrical. $d$ designates the clutch housing plate, which is bossed at the center to form an abutment $e$ for the clutch spiral spring $f$. The male clutch member comprises a spring steel disk $g$ provided with deep slots $h$ which divide it into arms $i$. Each of these arms supports a rim segment $j$ of T cross section riveted by two or more rivets to the arm $i$. These rim segments all support a ring segment or clutch facing of friction material $k$.

$l$ designates the usual clutch-shifting collar; $m$ the ball bearing used between the clutch-shifting fork (not shown) and this collar. $n$ represents the thrust ring for the spring; $o$ the ball bearing set between the ring and the clutch hub $p$. This hub is made up of a flanged sleeve $q$ splined to the driven shaft $r$, the ring $s$ having a shoulder $t$ engaging the turned-out flange $u$ of the clutch-shifting sleeve $v$. The clutch is very easily assembled upon the hub and connected up with the clutch-shifting sleeve flange $u$ simply by riveting the center of the clutch disk to the flange of the sleeve $q$ and the ring $s$ and over the flange $u$ of the clutch-shifting sleeve $v$.

The spring disk $g$ is dished and consequently it is permissible to warp the same in at the center. This is precisely what occurs when the clutch spring $f$ is permitted to thrust the clutch parts into engagement. The dished disk is thrust in by the clutch spring at the center. This tends to spread the arms $i$ radially outward, as will be obvious. Hence this forces the rim segments radially outward and forces the clutch facing $k$ into engagement with the face of the driving member. This action is accomplished with a minimum amount of pressure for the reason that it has the advantage of a considerable leverage. The action is essentially a toggle action or an inclined strut action where the pressure is exerted at the knee of the toggle or the top of the strut. It is well known that the movement at the knee of a toggle, when near a position where the arms are substantially in a straight line, can be considerable without very materially moving the ends of the toggle arms and hence the mechanical advantage in this position is very large. The same principle holds true in this slotted dished disk clutch. This being true, it will be evident that a comparatively weak clutch spring can be employed to force the male clutch member properly into engagement with the female clutch member. Hence the pedal action to retract the clutch may be very much lighter than would otherwise be the case.

Another most important feature of the clutch arrangement is that the parts first engage on the outside, as will be evident from Fig. 3, where it will be seen that the clutch facing at the outside of the clutch is nearer into engagement than the inner side of the clutch facing. The clutch parts are originally so designed as to effect this greater proximity of the outer edge than the inner. The male clutch part moving axially will bring the outer edge of the clutch facing first into engagement when a resistance is established and a continued force applied will result in a radial thrust which tends to bend the spring arms over slightly, bringing the remainder of the width of the clutch facing into engagement with the female clutch member. This action is a progressive one and is in effect a rocking action so that the entire width of the clutch facing sort of rocks into engagement with the surface of the female clutch member. This progressively and easily augments the gripping area to absolutely prevent any grabbing action, and makes the engagement an easy and gradual one.

It will be noticed in the drawings that the segments $j$ are provided with interlocking tongues and recesses $x$. The purpose of this is to connect the clutch segments together so that the twisting forces are neutralized. By reason of the clutch facing first engaging at the outer side, as already explained, there is a tendency for each segment to twist about its center on an axis radial to the clutch axis. By interlocking the clutch segments together by this sliding tongue and recess arrangement $x$, this neutralizes these forces.

As already stated, the surface of the female clutch member does not have to be a conical one—it may be a cylindrical one and the clutch work precisely the same. The surface of the clutch parts may be conical to compensate for wear so that notwithstanding the wear of the surface the movement to bring the clutch parts into engagement will be the same.

It will be evident from an understanding of the parts already described that a simpler and more economical construction could hardly be conceived. This clutch, although superficially resembling a simple cone clutch, has an action entirely different. On the other hand, it has many of the advantages of a multiple disk clutch and yet is very simple compared with a multiple disk clutch. It has also all the advantages of many other varieties of clutches which are more complicated.

What I claim is:

1. A clutch, having in combination a female cone clutch member, a male cone clutch member made up of a plurality of segments of substantially T cross section and extremely resistant to flexing, flexible spring spokes on which the segments are carried and arranged to give the segments a radial expansion or contraction when the disc is flexed, and means for thrusting or pulling the spokes along the axis of the clutch, the said elements being arranged so that before engagement the male cone is more obtuse than the female cone, whereby the line of contact is first at the outer end of the male cone and then the segments may rock into full face engagement by reason of the flexible spokes.

2. A clutch, having in combination, a female cone clutch member, a male cone clutch member, the latter comprising a plurality of segments highly resistant to flexing, and separate flexible spokes carrying said segments, the conical surfaces of the two cones being divergent from front to rear when first engaging, and operating means whereby pressure on the center of the spokes will flex the spokes and disengage or engage the segments with a rolling surface disengagement or engagement in accordance with the direction of the operation.

3. A clutch, having in combination, a female clutch member, a male clutch member made up of a plurality of separate segments having, however, a circumferentially sliding interlocking relation with each other, and a plurality of arms for carrying said segments adapted to be spread or contracted radially.

4. A clutch, having in combination, a female clutch member, a male clutch member made up of a plurality of segments having a tongue and recess interlocking engagement, and a plurality of arms adapted to be spread or contracted radially and arranged to carry the said segments.

5. A clutch, having in combination, a female clutch member, a male clutch member made up of a plurality of segments and arranged to engage the female clutch member first at one edge, the said segments being interlocked at their ends and circumferentially with each other so as to neutralize twisting stresses, and a plurality of arms for carrying said segments adapted to spread or contract in a radial direction.

In testimony whereof I affix my signature.

ERNEST E. WEMP.